A. S. WISHART.
DRILL AND FERTILIZER DISTRIBUTER.
No. 171,461. Patented Dec. 21, 1875.
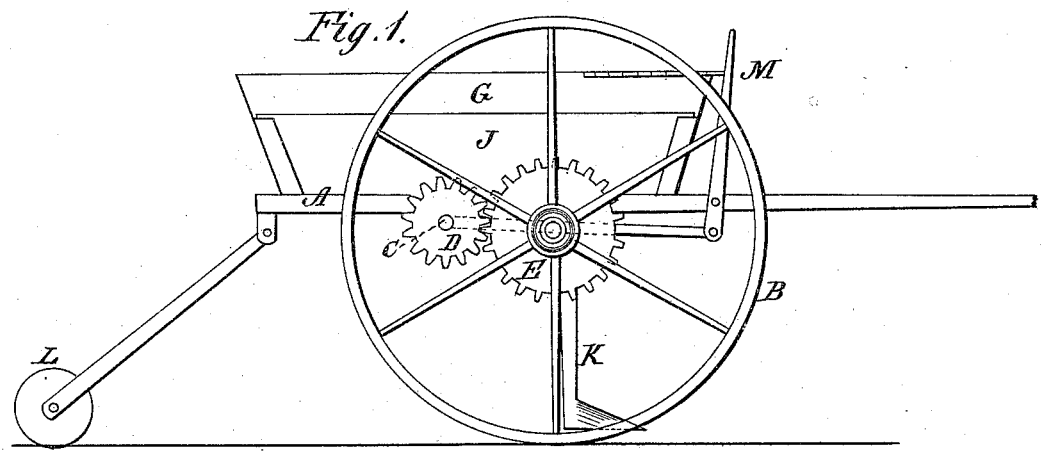
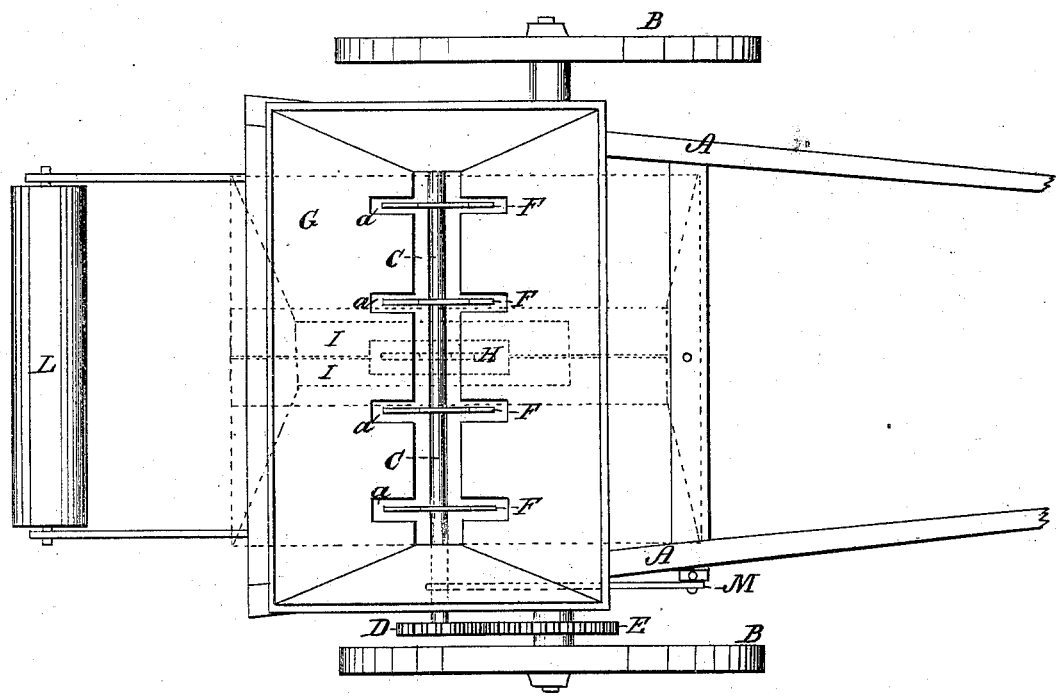
WITNESSES:
W. W. Hollingsworth
Colon C. Kernon
INVENTOR:
A. S. Wishart
BY
ATTORNEYS.

UNITED STATES PATENT OFFICE.

ALADAN S. WISHART, OF LUMBERTON, NORTH CAROLINA.

IMPROVEMENT IN DRILLS AND FERTILIZER-DISTRIBUTERS.

Specification forming part of Letters Patent No. 171,461, dated December 21, 1875; application filed June 7, 1875.

*To all whom it may concern:*

Be it known that I, ALADAN S. WISHART, of Lumberton, in the county of Robeson and State of North Carolina, have invented a new and Improved Combined Drill and Fertilizer-Distributer; and I do hereby declare that the following is a full, clear, and exact description of the same, reference being had to the accompanying drawing, forming a part of this specification, in which—

Figure 1 is a vertical side elevation; Fig. 2, a plan view.

The object of this invention is to provide a combined drill and fertilizer-distributer, or a drill which is convertible at will into a broadcast fertilizer-distributer.

It consists in a shaft carrying feed-wheels or stirrers located parallel with the axle, and actuated through gear-wheels by the driving-wheels. An adjustable hopper is arranged upon the frame, so that when it is disposed longitudinally a single one of the feed-wheels revolves in an adjustable orifice at the bottom to constitute a drill for planting cotton and other seed, and when the said hopper is arranged transversely, or parallel with the shaft, all the said feed-wheels revolve in the said hopper, and act as stirrers to sow broadcast the guano or other fertilizer.

In the drawing, A represents the frame-work supported upon the driving-wheels B. C is a transverse shaft running parallel with the axle, and revolved by a cog-wheel, D, which gears with a similar wheel, E, upon the main driving-wheels. The said shaft carries a series of toothed wheels, F, which act as feed-wheels for the seed, and stirrers or distributers for the fertilizer, according to the purpose of the adjustment. G is a hopper, which is made adjustable upon the frame-work, and so constructed as to be disposed longitudinally, as shown in dotted lines, for seeding purposes, or transversely for the broadcast distribution of the fertilizer. The said hopper has a longitudinal slot in its bottom, which, when arranged longitudinally for seeding, is closed, except immediately around the central wheel H by two adjustable slides I. The said wheel, revolving in said open space between the slides, and in the slot of the hopper, feeds from the hopper the cotton or other seed that are to be planted. When the device is to be used as a fertilizer-distributer, the hopper is arranged parallel with the axle, with its slot immediately above the shaft C. The wheels of said shaft then revolve in the corresponding transverse slots $a$ in the bottom of the hopper, and all operate at one time to produce a broadcast fertilizer-distributer. J J are slides upon the under side of the hopper, which, when the device is used for seeding, close the slots $a$. K is an opener or furrow plow, and L a covering-roller. M is a shifting-lever attached to the shaft C, whereby the wheel upon said shaft may be thrown out of gear with the driving-wheels.

Having thus described my invention, what I claim as new is—

1. The combination, with the revolving shaft C carrying a series of wheels, of a reversible hopper having a slotted bottom, substantially as and for the purpose described.

2. The combination of shaft C carrying a series of wheels, the reversible hopper G having a single longitudinal slot, and also transverse slots $a$, and the adjustable slides I I and J J, substantially as and for the purpose specified.

ALADAN STRONG WISHART.

Witnesses:
 DURHAM LEWIS,
 W. B. BLAKE.